(12) United States Patent
Katkar

(10) Patent No.: US 8,914,908 B2
(45) Date of Patent: Dec. 16, 2014

(54) COMPLETELY AUTOMATED COMPUTER IMPLEMENTED SYSTEM AND METHOD FOR PIRACY CONTROL BASED ON UPDATE REQUESTS

(75) Inventor: Sanjay Katkar, Pune (IN)

(73) Assignee: Quick Heal Technologies (P) Ltd., Pune, Maharashtra (IN)

( * ) Notice: Subject to any disclaimer, the term of this patent is extended or adjusted under 35 U.S.C. 154(b) by 78 days.

(21) Appl. No.: 13/199,753

(22) Filed: Sep. 8, 2011

(65) Prior Publication Data

US 2012/0060228 A1   Mar. 8, 2012

(30) Foreign Application Priority Data

Sep. 8, 2010  (IN) .......................... 2486/MUM/2010

(51) Int. Cl.
| | |
|---|---|
| G06F 21/00 | (2013.01) |
| G06F 21/30 | (2013.01) |
| G06F 21/10 | (2013.01) |

(52) U.S. Cl.
CPC .............. *G06F 21/10* (2013.01); *G06F 21/305* (2013.01); *G06F 2221/2115* (2012.01); *G06F 2221/2129* (2013.01); *G06F 2221/2151* (2013.01)
USPC ................... 726/33; 726/26; 726/27; 726/29; 726/31; 713/159; 713/193; 705/50; 705/57

(58) Field of Classification Search
USPC .......... 726/26, 27, 30–33; 713/150, 155, 165; 705/57–59
See application file for complete search history.

(56) References Cited

U.S. PATENT DOCUMENTS

| | | | | |
|---|---|---|---|---|
| 6,889,209 | B1 * | 5/2005 | Rabin et al. ..................... | 705/57 |
| 7,502,323 | B2 * | 3/2009 | Brun et al. ..................... | 370/235 |
| 8,225,088 | B2 * | 7/2012 | Ueda et al. ..................... | 713/158 |
| 2006/0026690 | A1 * | 2/2006 | Yu et al. .......................... | 726/27 |
| 2009/0307257 | A1 * | 12/2009 | Menon et al. .................. | 707/102 |
| 2010/0212019 | A1 * | 8/2010 | Rabin et al. ..................... | 726/26 |

OTHER PUBLICATIONS

Managing update conflicts in Bayou, a weakly connected replicated storage system Terry et al; ACM SIGOPS Operating 1995; 12 pages.*

* cited by examiner

*Primary Examiner* — Jason Lee
(74) *Attorney, Agent, or Firm* — Feldman Law Group, P.C.; Stephen E. Feldman

(57) ABSTRACT

An automated system and method for piracy control based on user generated updates is described. The system and method described renders human intervention for piracy control superfluous and, therefore, is cost-effective, and consumes less time. The automated system and method for piracy control based upon update requests significantly reduces the number of update requests by pirated copies of the software, reduces the burden on the update server and smoothens the overall user experience for the legitimate users of the software.

9 Claims, 2 Drawing Sheets

COMPLETELY AUTOMATED COMPUTER IMPLEMENTED SYSTEM AND METHOD FOR PIRACY CONTROL BASED ON UPDATE REQUESTS

CLAIM OF FOREIGN PRIORITY TO

India provisional application no. 2486/MUM/2010 filed on Sep. 8, 2010 and corresponding India nonprovisional application filed on Sep. 7, 2011 (the number of the corresponding India nonprovisional application is to be determined).

FIELD OF THE INVENTION

The present invention generally relates to computer implemented system and method for piracy control. The present invention particularly relates to an automated computer implemented system and method for piracy control that is based on update requests.

BACKGROUND OF THE INVENTION

Software piracy is a broad term that encompasses software counterfeiting, OEM unbundling, softlifting, corporate software piracy and Internet software piracy. Software piracy is the critical issue plaguing the software industry today. According to the piracy study conducted by Business Software Alliance (BSA) in 2010, the bane of software piracy caused the industry damage to the tune $51 billion.

Various systems and methods are available in the prior art for prevention of software privacy. Most of these systems and methods rely on the procedure of product activation after installation for piracy control. The license validation procedure of product activation requires the user to provide valid product key to authentic the product at the time of activation. The product is activated on successful verification of the product key and, thereafter, the user receives regular and periodic updates. The software license, usually, also entitles the user to reinstallation and reactivation.

For reactivation, the user is again required to provide the unique product key assigned to the software after reinstallation. The unique product key provided by the user is again authenticated and the software thus reactivated again becomes entitled to receive regular and periodic updates, which are from the software vendor.

However, the procedure of reactivation is prone to be exploited by users to commit software piracy. Since there is no limit on reactivation, the user first purchases and registers a single user copy of the software, and then reactivates the same software with the same product key on multiple machines. This also creates a situation wherein pirated copies of the software, just like genuine copies, also request and receive updates. The software updates are important in order to fix known bugs, to add security patches, to add new functionality, and to keep the software compatible with other program. The barrage of update requests from pirated copies of the software only creates server congestion and, more critically, delays delivery of updates to genuine copies of the software. Thus, the bandwidth guzzling update requests, particularly from pirated copies, also cost the software companies in pecuniary terms.

Further, the existing solutions for privacy control also require users to call a support centre to complete the activation of the software. The legitimate users, who have paid a significant amount for the software license, have to provide details such as, for example, purchase details, personal details and adequate reasons for performing reactivation. Thus, the whole procedure of reactivation requires human intervention, consumes time and can cause a certain amount discomfort. These un-automated solutions for piracy control, therefore, require dedicated support teams, who may be compromised under duress and various other considerations, to take care of activation and re-activation related issues. Therefore, the solutions for piracy control in the prior art are not cost-effective, time-consuming and also degrades the user experience for the legitimate users.

Therefore, what is needed is an automated system and method for piracy control that is devoid of any human intervention for piracy control and that is cost-effective, consumes less time. What is further needed is an automated system and method for piracy control based upon update requests that significantly reduces the number of update requests by pirated copies of the software, and smoothens the overall user experience for the legitimate users of the software.

SUMMARY OF THE INVENTION

An automated computer implemented system for piracy control based on user generated update requests is described. The system includes a registration server that is adapted to receive and process user generated registration and activation requests and software update requests. The registration server further includes a registration module that receives user registration and activation requests and extracts at least a software product key, a software installation identification number and a Machine Access Control address included in every user generated registration and activation request. The system has a repository that includes a first table that stores a plurality of software installation identification numbers, Machine Access Control addresses and timestamps corresponding to a plurality of software product keys and a second table that stores a plurality of unique entries that correspond to a plurality of unique software product keys. Each unique entry includes at least the software installation identification number, the Machine Access Control address and the timestamp. The system also includes an update module that receives user generated update requests and extracts at least a software product key, a software installation identification number and a Machine Access Control address from every user generated update request and matches entry with the plurality of unique entries corresponding to the unique software product keys and finds the entry that corresponds to the same product key extracted from the user update request entry in the second table. The update further compares the entry with the plurality of entries corresponding to the same product key to find out the earliest registration and activation corresponding to the same product key and flags and deactivates software installations corresponding to same product key but having later registration and activation entries.

BRIEF DESCRIPTION OF THE DRAWINGS

The various aspects and advantages of the present invention will become better understood with regard to following description, appended claims and accompanying drawings, wherein like reference numerals refer to similar parts throughout the several figures where:

DETAILED DESCRIPTION OF THE INVENTION

Figure 1:
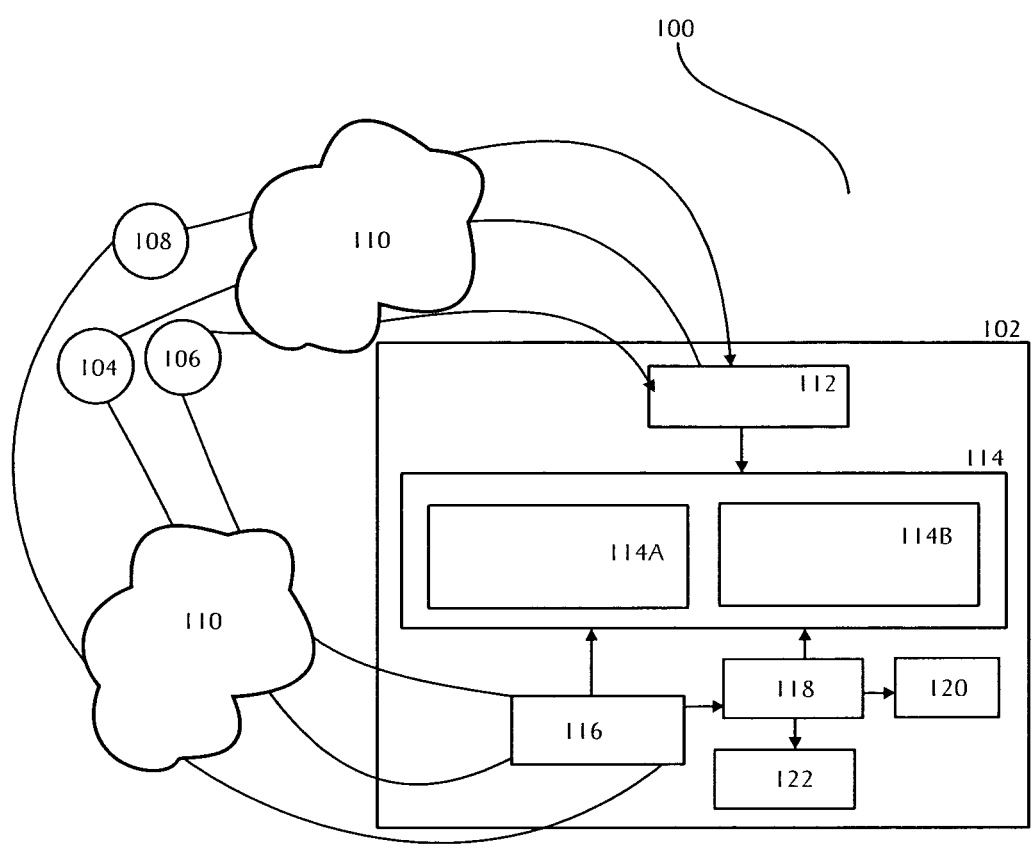
FIG. 1 is a block diagram of an automated computer implemented system for piracy control based upon update requests.

Although specific terms are used in the following description for sake of clarity, these terms are intended to refer only to particular structure of the invention selected for illustration in the drawings, and are not intended to define or limit the scope of the invention.

FIG. 1 shows a block diagram of an automated computer implemented system 100 for piracy control based upon activation and update requests that is used when a software is first activated and thereafter whenever the software is reinstalled, reactivated and updated. The automated computer implemented system 100 for piracy control in accordance with the present invention includes a registration server 102 that receives and processes registration requests sent from a plurality of computing devices 104, 106, 108 over the Internet 110.

The registration server 102 further includes a registration module 112 that executes an activation and registration script, a repository 114 that includes an installation table 114A that stores unique product keys, unique installation identification numbers, Media Access Control addresses (MAC addresses) and timestamps associated software copies that are activated. The software license is activated as soon as the software is installed on the computing device. A user generated registration and activation request is sent to the registration server 102.

The registration and activation request includes a unique product key, a unique installation identification number and MAC address associated with the particular software copy. Each product key is unique to a particular software copy. The installation identification number is unique to a particular installation. A unique installation identification number and a unique timestamp are generated for every reinstallation and reactivation that takes place for the particular software copy. An entry that includes the unique product key, the unique installation identification number and the timestamp is stored in the installation table 114A after the activation and registration. The timestamp corresponds to the time when user generated registration and activation request is received. However, the installation table 114A may have a plurality of entries pertaining to plurality of reinstallation and reactivation requests that may be generated by the particular software copy. However, the active table 114B stores only the latest entry for each software copy. The latest entry includes the unique product key, the unique installation identification number and timestamp pertaining to the particular software copy. So, for 'n' number of copies installed, 'n' numbers of entries are stored in the active table 114B. The activation and registration script included in the registration module 112 extract information embedded in the user generated activation and registration request. The information includes the unique product key, the unique installation identification number and the MAC address unique to computing device from which the request is generated.

The registration module 112 sends the information to the repository 114 which stores at least the unique product key, the unique installation identification number and the MAC address in the form row entry in the installation table 114A. The entry is also stored in the active table 114B. If already there is an entry in the active table 114B, the latest entry replaces the earlier entry in the active table 114B. Thus, only one entry pertaining to the registration and activation request remains in the active table 114B for every unique product key. Thus, the process of registration and activation of the software copy is accomplished.

The registration server 102 is connected over the Internet 110 to a plurality of computing devices 104, 106, 108 on which the software is installed. The users that use computing devices 104, 106 and 108, and generate requests for registration and activation of the software, may or may not be legitimate. However, for every request, whether that request is generated by a legitimate or an illegitimate user, corresponding entries are stored in the installation table 114A and the active table 114B.

The active table 114B contains all the information pertaining to user generated registration and activation requests, which is updated from time to time. The information update takes place whenever there is a reinstallation and reactivation. The registration module 112 checks whether there is an entry in the active table 114B corresponding to the product key received in the reinstallation and reactivation request. It is noted here that the product key is a primary key in the active table 114B, and, therefore, multiple entries for the same product key are not possible in the active table 114B.

The reinstallation and reactivation of the software may be necessitated, for example, upon formatting of the hard disk of the computing device on which the software is installed.

In the case of reinstallation and reactivation upon formatting of the computing device on which the software is installed, the MAC address and the product key remains unchanged, and only the identification number pertaining to the installation is changed. The installation identification number is changed if the registration module 112 finds out that that the same product key already exists in the active table 114B.

The reinstallation and reactivation may also be necessitated upon change of the computing device by a user. In the case of reinstallation and reactivation of the software on a different computing device, only the product key remains unchanged, and the MAC address and the identification number pertaining to the installation changes for every reinstallation and reactivation. The installation identification number and the MAC address are changed if the registration module 112 finds out that the same product key already exists in the active table 114B.

The license validation procedure of the software copy is not triggered at the time of registration and activation of the software. The registration and activation procedure only collects and stores product keys, installation identification numbers, MAC addresses and timestamps. The registration server 102 further includes an update module 116, a match finder module 118, a flagging module 120 and a blocking module 122. The update module 116, the match finder module 118, the flagging module 120 and the blocking module 122 collaborate and interface with the repository 114 to accomplish the license validation procedure. The update module 116 receives a plurality of users generated update requests from a plurality of software installations on corresponding plurality of computing devices 104, 106, 108. The update request that is received also includes at least the product key, the installation identification number and the MAC address, and is also present in the form an entry in the installation table 114A in the repository 112. A timestamp that corresponds to the time when the update request is received is stored in the form an entry in the installation table 114A.

It is further understood that since the piracy check is not done at the time of registration, there may be a plurality of entries for the same product key in the installation table 114A. Therefore, even if the software copy is illegitimate, for the same product key, installation identification number and MAC address is changed in the active table 114B. Another entry that stores the product key, the installation identification number and the MAC address is also made in the installation table 114A. Therefore, the installation table 114A may have multiple entries corresponding to the same product key with different installation identification numbers, MAC addressed and associated timestamps. The multiple entries thus stored in the installation table 114A corresponding to the same product are used for piracy check by the update module 116.

The update module 116 further sends the information in the update request entry that is previously stored during installation and activation in the installation table 114A to the match finder module 118. The match finder module 118 compares the information contained in the latest update request entry and stored in the installation table 114A with the all the information contained in the active table 114B. Therefore, in other words, the match finder module 118 compares the product key, the unique installation identification number and the MAC address corresponding to the latest update request and stored in the installation table 114A with the product keys, the unique installation identification numbers and the MAC addresses stored in the active table 114B.

If the match finder module 118 finds an entry for the product key received in the update request, and if all the information contained in the update request matches with the information already contained in the active table 114B corresponding to the same product key, the match finder module 118 assumes that the software copy that requested the update is genuine. The update request is granted and the software is updated.

If the match finder finds and entry for the product key received in the update request, and if all the information contained in the update request fails to match with the information already contained in the active table 114B corresponding to the same product key, the match finder module 118 looks for the entry corresponding to the same product key and the same installation identification number in the installation table 114A. The match finder module 118 finds the entry corresponding to the same product key and the same installation identification number in the installation table 114A. The match finder module 118 compares the timestamp of the entry in the installation table 114A with the timestamp of the entry corresponding to the unique current entry corresponding to the same product key in the active table 114B to determine the earliest software installation.

If the timestamp of the installation corresponding to product key, installation identification number and the MAC address received in the update request entry is not the earlier of the entries, the match finder module 118 assumes that the software copy that requested the update is not genuine. The update request is rejected and the software is not updated. Whereas, if the timestamp of the installation corresponding to product key, installation identification number and the MAC address received in the update request entry is the earlier of the entries, the match finder module 118 assumes that the software copy that requested the update is genuine. An appropriate change is made to the current entry corresponding to the same product key in the active table 114B. The existing installation identification number and the MAC address is replaced with installation identification number and the MAC address pertaining to the genuine software installation.

It is further noted that the important aspect of the invention is that, even if few updates requests are granted to the illegitimate users, legitimate users are not discomforted by disadvantages associated with the license validation procedures that involve or may involve human intervention at some stage. Therefore, if the illegitimate software installation sends an update request before the legitimate software installation that update request is granted. However, when the legitimate software installation sends the update request it is granted and the illegitimate software installation is immediately identified. It is observed that product key is often shared by a plurality of users. The shared product key is either leaked or pilfered. The present system based on update requests significantly help reduce and prevent piracy based on product key leakage or pilferage.

In case of the illegitimate software copies, the information is sent to the flagging module 120 and the blocking module 122. The flagging module 120 flags the software installation as illegitimate and the blocking module 122 blocks further updates to the computer device on which the software installation resides. A warning is sent to illegitimate users proclaiming that the software copy is not genuine, further updates are stopped and the software installation is deactivated Referring to FIG. 2, the process followed by the computer implemented system 100 for piracy control based on update requests in accordance with the present invention is shown. The process starts at 200 and at step 202 a request for product update is received. The process then moves to step 204 where the software product key and installation identification number received in the update request entry is compared with the software product key and the installation identification table in the active table 114B and the process moves step 206.

At step 206, based on the comparison done at step 204 it is determined whether the copy of the software product has been reactivated. In this case the current entry corresponding to the same product key in the active table 114B does not match with the information sent by the update request. If the answer is 'No', the process moves to step 208 where the software product is update and the process ends at step 210. If the answer is 'Yes', the process moves to step 212.

At step 212, it is further determined whether there is present another any other instance of the same product key in the installation table 114A of the software that has been reactivated. If the answer is 'No', the process moves to step 214. At step 214 the software product is rejected and the process ends at step 216. If the answer is 'Yes', the process moves to step 218.

At step 218, whether the other instance of the installation corresponding to the same product key requesting an update is older than the current earliest instance of the installation is determined. For this purpose, the timestamp of current entry in the active table 114B corresponding to the same product key is compared with the timestamp corresponding to the matching entry in the installation table 114A. If the timestamp of the registration and activation in the installation table 114A pertaining to the current update request that is requesting the update, predates the timestamp of the entry in the active table 114B, the entry in the active table 114 B is overwritten with the information, which includes the product key, the software installation identification number, contained in the update request.

If the answer is 'No', the process moves to step 220. At step 220, the current instance is flagged to be genuine, the updates to other instance(s) are blocked and the process moves to step 222. At step 222, the current instance of the installation of the software product is upgraded and the process moves to step 224 and ends. If the answer is 'Yes', the process moves to step 226. At step 226, the other instance of the software installation determined to be genuine is updated and the process ends at step 228.

Thus, the process of the process followed by the computer implemented system 100 for piracy control based on update requests in accordance with the present invention does not involve any human intervention at any stage and presents a smooth customer experience that devoid of any call center frustrations.

In Operation

Figure 2:
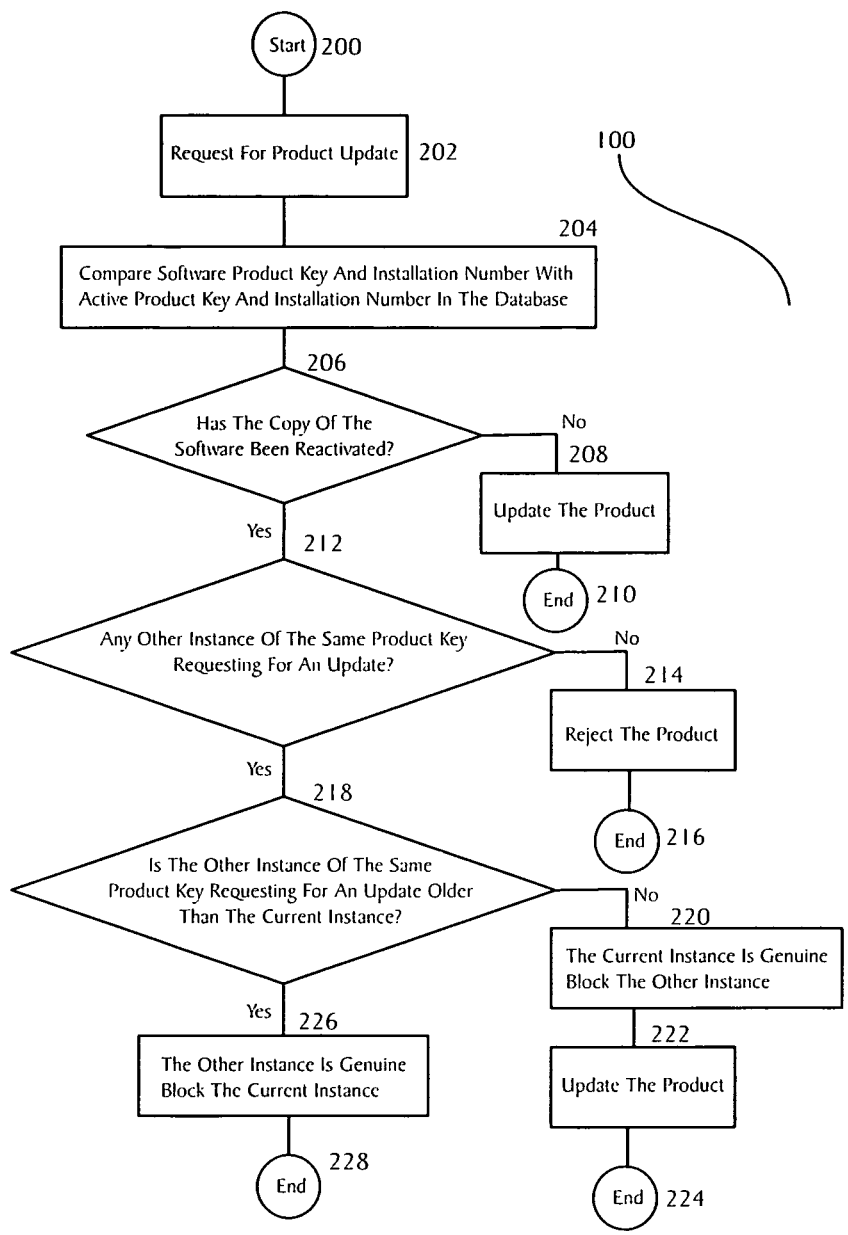
FIG. 2 is a flow chart of the exemplary automated computer implemented system and method for piracy control that can process update requests.

Referring to FIGS. 1 and 2 how the computer implemented system 100 for piracy control based on update requests works is explained.

In accordance with the present invention, a genuine software copy is installed on the computing device 104 by the user. As soon as the software is installed the software copy is activated and registered. The unique product key, the software installation identification number and the MAC address are sent to the registration server 102 over the Internet 110. The registration module 112 inside the registration severs interfaces with the repository 114 and stores at least the product key, the software installation number and the MAC address in the installation table 114B and the active table 114B. The product key is stored as the primary key in the active table 114B.

At some point in time, the computing device 104 receives an update notification over the Internet 110. After the update notification is received, the user generates an update request. The update request is sent to the update module 118 inside the registration server 112. The update request includes the product key, the software installation identification number and the MAC address that is previously sent to the registration during registration and activation. The update module 116 sends the information to the match finder module 118. The match folder module 118 checks whether there is an entry corresponding to the same product key in the active table 114B. If there is such entry corresponding to the same product key and other information such as software installation identification number and the MAC address also matches, the software installation is deemed to be genuine. Since the update request is made by the legitimate user the information corresponding to the product key provided in the update request matches with the entry corresponding to the same product key in the active table 114B. The update request is granted and the software is updated.

In accordance with the present invention, an illegitimate software copy is installed on the computing device 106 by the user. As soon as the software is installed the even the illegitimate software copy is activated and registered. The unique product key, the software installation identification number and the MAC address are sent to the registration server 102 over the Internet 110. The registration module 112 inside the registration severs interfaces with the repository 114 and stores at least the product key, the software installation number and the MAC address in the installation table 114B and the active table 114B. The product key is stored as the primary key in the active table 114B.

At some point in time, the computing device 106 receives an update notification over the Internet 110. After the update notification is received, the user generates an update request. The update request is sent to the update module 118 inside the registration server 112. The update request includes the product key, the software installation identification number and the MAC address that are previously sent to the registration during registration and activation. The update module 116 sends the information to the match finder module 118. The match folder module 118 checks whether there is an entry corresponding to the same product key in the active table 114B.

If there is entry corresponding to the same product key and other information such as software installation identification number and the MAC address in the active table 114B fails to match with similar information sent with the update request. Then the match finder module searches for the entry corresponding to the update requesting installation in the installation table 114A, the entry that is made during the installation of the software, to find out the earlier entry. It is found out that the entry of the illegitimate installation is not the earlier of the entries. Therefore, the update request is not granted, the software is not updated. The update to the installation is blocked.

However, even in case of illegitimate software installation, the update request is granted and the software is updated, if the genuine software installation has not yet requested for the update.

In accordance with the present invention, a genuine software copy is already installed on the computing device 108 by the user. However, the genuine software copy has not requested any software update so far. The update request for the same product key is previously requested by a later illegitimate installation on another computing device. Since the genuine installation has not requested update yet, the updates have already been granted to the illegitimate installation. The single entry corresponding to the same product key in the active table 114B corresponds to the illegitimate installation. When the genuine software copy installed on the computing device 108 receives an update notification it sends an update request. The update module 116 receives the update request. The product key, the software installation identification number and the MAC address corresponding to the software installation is then send to the match finder module 118. The match finder module 118 then checks for the unique current entry corresponding to the same product key and finds that there is already present an entry with different installation identification number and MAC address. The match finder module 118 then searches the installation table 114A for the entry corresponding to the combination of the same product key, the same installation identification number and the MAC address. The match finder module 118 then compares the timestamp of the entry in the installation table 114A that corresponds to the genuine software installation that is installed computing device 108 with the timestamp in the unique current entry that corresponds to the same product key and finds out the genuine installation has an earlier timestamp. Therefore, the match finder module 118 assumes that later installation to be illegitimate. The flagging module 120 flags the illegitimate installation and the blocking module 122 stops further updates. Since the genuine software installation installed on computing device 108 is the earlier of the two installations, the genuine installation receives updates.

Thus, the computer implemented software system and method 100 for privacy control is implemented based on update requests. During the entire process of license validation, at no stage, human intervention is necessary. In some cases, the illegitimate software installations may receive update even before the genuine software installation that are installed on earlier but are never updated. But the update requests made by the users of the genuine software installations are obliged instantly. The illegitimate software installations do not hinder the update requests for the genuine installations. The entire process, implemented by the computer implemented system for piracy control 100 based on update requests, reduces burden on the update services and discourages the illegitimate users. There is also overall improvement in quality of the online updating services along with significant cost reduction.

The present invention has been described in an illustrative manner, and it is to be understood that the terminology used is intended to be in the nature of description rather than of limitation.

It is not intended to be exhaustive or to limit the invention to the precise form disclosed. Many modifications and verifications are possible in light of the above teaching. It is intended that the scope of the invention be limited not by this detailed description, but rather by the claims appended hereto. It is also to be understood that the following claims are intended to cover all of the generic and specific features of the invention described herein.

I claim:

1. A computer-implemented method comprising the steps of:
   receiving a first product key, a first Machine Access Control address and a first installation identification number for an update request associated with an installed copy of software, the update request being associated with a first timestamp;
   storing the first product key, the first Machine Access Control address, the first installation identification number and the first timestamp in a first table of a data repository;
   retrieving a second product key, a second Machine Access Control address, a second installation identification number and a second timestamp from a second table of the data repository, the second product key, the second Machine Access Control address, the second installation identification number and the second timestamp being associated with a most-recent installed copy of software;
   comparing the first product key, the first Machine Access Control address and the first installation identification number with the second product key, the second Machine Access Control address and the second installation identification number;
   if the first product key, the first Machine Access Control address and the first installation identification number does not match the second product key, the second Machine Access Control address and the second installation identification number, retrieving a third timestamp related to entries recorded earliest in the first table with respect to the first product key, the first Machine Access Control address and the first installation identification number;
   comparing the third timestamp to the second timestamp; and
   if the third timestamp predates the second timestamp, granting the update request and further overwriting the second product key, the second Machine Access Control address, the second installation identification number and the second timestamp with the first product key, the first Machine Access Control address, the first installation identification number and the first timestamp in the second table.

2. The computer-implemented method of claim 1 further comprising the step of:
   if the second timestamp predates the third timestamp, flagging the installed copy of software as illegitimate.

3. The computer-implemented method of claim 2 further comprising the step of:
   if the second timestamp predates the third timestamp, blocking the installed copy of software from updates.

4. A system comprising:
   one or more hardware processors;
   one or more non-transitory computer-readable storage medium containing instructions configured to cause the one or more processors to perform operations including:
   receiving a first product key, a first Machine Access Control address and a first installation identification number for an update request associated with an installed copy of software, the update request being associated with a first timestamp;
   storing the first product key, the first Machine Access Control address, the first installation identification number and the first timestamp in a first table of a data repository;
   retrieving a second product key, a second Machine Access Control address, a second installation identification number and a second timestamp from a second table of the data repository, the second product key, the second Machine Access Control address, the second installation identification number and the second timestamp being associated with a most-recent installed copy of software;
   comparing the first product key, the first Machine Access Control address and the first installation identification number with the second product key, the second Machine Access Control address and the second installation identification number;
   if the first product key, the first Machine Access Control address and the first installation identification number does not match the second product key, the second Machine Access Control address and the second installation identification number, retrieving a third timestamp related to entries recorded earliest in the first table with respect to the first product key, the first Machine Access Control address and the first installation identification number;
   comparing the third timestamp to the second timestamp; and
   if the third timestamp predates the second timestamp, granting the update request and further overwriting the second product key, the second Machine Access Control address, the second installation identification number and the second timestamp with the first product key, the first Machine Access Control address, the first installation identification number and the first timestamp in the second table.

5. The system of claim 4 further comprising the step of:
   if the second timestamp predates the third timestamp, flagging the installed copy of software as illegitimate.

6. The system of claim 5 further comprising the step of:
   if the second timestamp predates the third timestamp, blocking the installed copy of software from updates.

7. A computer-program product, the product tangibly embodied in a non-transitory machine-readable storage medium, including instructions configured to cause a data processing apparatus to:
   receive a first product key, a first Machine Access Control address and a first installation identification number for an update request associated with an installed copy of software, the update request being associated with a first timestamp;
   store the first product key, the first Machine Access Control address, the first installation identification number and the first timestamp in a first table of a data repository;
   retrieve a second product key, a second Machine Access Control address, a second installation identification number and a second timestamp from a second table of the data repository, the second product key, the second Machine Access Control address, the second installation identification number and the second timestamp being associated with a most-recent installed copy of software;
   compare the first product key, the first Machine Access Control address and the first installation identification number with the second product key, the second Machine Access Control address and the second installation identification number;
if the first product key, the first Machine Access Control address and the first installation identification number does not match the second product key, the second Machine Access Control address and the second installation identification number, retrieve a third timestamp related to entries recorded earliest in the first table with respect to the first product key, the first Machine Access Control address and the first installation identification number;
compare the third timestamp to the second timestamp; and
if the third timestamp predates the second timestamp, grant the update request and further overwrite the second product key, the second Machine Access Control address, the second installation identification number and the second timestamp with the first product key, the first Machine Access Control address, the first installation identification number and the first timestamp in the second table.

8. The computer-program product of claim 7 further including instructions configured to cause the data processing apparatus to:
if the second timestamp predates the third timestamp, flag the installed copy of software as illegitimate.

9. The computer-program product of claim 8 further including instructions configured to cause the data processing apparatus to:
if the second timestamp predates the third timestamp, block the installed copy of software from updates.

* * * * *